United States Patent
Jung et al.

(10) Patent No.: US 8,594,195 B2
(45) Date of Patent: Nov. 26, 2013

(54) METHOD AND APPARATUS FOR ENCODING AND DECODING AT LEAST ONE IMAGE FRAME THAT IS ARTIFICIALLY INSERTED INTO IMAGE SEQUENCE

(75) Inventors: Hae-kyung Jung, Seoul (KR);
Young-yoon Lee, Suwon-si (KR);
Woo-jin Han, Suwon-si (KR); Yu-mi Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 12/613,601

(22) Filed: Nov. 6, 2009

(65) Prior Publication Data
US 2010/0290525 A1 Nov. 18, 2010

(30) Foreign Application Priority Data
May 12, 2009 (KR) ........................ 10-2009-0041394

(51) Int. Cl.
*H04N 7/26* (2006.01)

(52) U.S. Cl.
USPC ............ 375/240.12; 375/240.01; 375/240.26

(58) Field of Classification Search
USPC .......................... 375/240.01, 240.12, 240.26
See application file for complete search history.

(56) References Cited

U.S. PATENT DOCUMENTS

| | | | | |
|---|---|---|---|---|
| 5,565,920 | A | * | 10/1996 | Lee et al. ................. 375/240.11 |
| 5,978,029 | A | * | 11/1999 | Boice et al. .............. 375/240.14 |
| 6,473,459 | B1 | * | 10/2002 | Sugano et al. ........... 375/240.16 |
| 2002/0191112 | A1 | * | 12/2002 | Akiyoshi et al. .............. 348/700 |
| 2003/0031251 | A1 | * | 2/2003 | Koto ........................ 375/240.03 |
| 2006/0239361 | A1 | * | 10/2006 | Iguchi et al. ............. 375/240.29 |

* cited by examiner

*Primary Examiner* — Sath V Perungavoor
*Assistant Examiner* — Jeffery Williams
(74) *Attorney, Agent, or Firm* — Sughrue Mion, PLLC

(57) ABSTRACT

Provided are a method and apparatus for encoding and decoding at least one image frame artificially inserted by a user among a plurality of image frames of an image sequence by using a parameter regarding characteristics of the image frame.

18 Claims, 5 Drawing Sheets

METHOD AND APPARATUS FOR ENCODING AND DECODING AT LEAST ONE IMAGE FRAME THAT IS ARTIFICIALLY INSERTED INTO IMAGE SEQUENCE

CROSS-REFERENCE TO RELATED PATENT APPLICATION

This application claims the benefit of Korean Patent Application No. 10-2009-0041394, filed on May 12, 2009, in the Korean Intellectual Property Office, the disclosure of which is incorporated herein in its entirety by reference.

BACKGROUND OF THE INVENTION

1. Field of the Invention

Exemplary embodiments of the present invention relate to a method and apparatus for encoding and decoding an image, and more particularly, to a method and apparatus for encoding and decoding a plurality of image frames of an image sequence.

2. Description of the Related Art

Image compressing methods, such as MPEG-1, MPEG-2, and MPEG-4H.264/MPEG-4 advanced video coding (AVC), perform prediction encoding with respect to an image frame by using inter prediction or intra prediction.

A plurality of image frames of an image sequence are divided into Intra (I) pictures, predictive (P) pictures, or bi-directional predictive (B) pictures, and prediction encoding is performed with respect to the divided image frames, and an image sequence bitstream is generated.

I pictures are encoded using intra prediction in order to remove a spatial redundancy of a frame irrespective of frames before and after the frame. P and B pictures are encoded using inter prediction in order to remove a temporal redundancy between frames. P pictures are encoded using forward inter prediction. B pictures are encoded using bi-directional prediction.

A pixel value of each image frame is not encoded but a residual value generated by removing a spatial or temporal redundancy is encoded, thereby encoding an image at high compressibility.

SUMMARY OF THE INVENTION

Exemplary embodiments of the present invention provides a method and apparatus for encoding and decoding a plurality of image frames of an image sequence, and a computer readable recording medium having recorded thereon a program for executing the method.

According to an aspect of the present invention, there is provided an image encoding method includes: determining whether a current image frame is an inserted image frame to edit the image sequence; and encoding the current image frame by selectively using a parameter regarding characteristics of the current image frame according to a result of the determining.

The encoding of the current image frame may include: encoding the parameter regarding the characteristics of the current image frame if the current image frame is the inserted image frame according to the result of the determining, and performing prediction encoding with respect to the current image frame if the current image frame is not the inserted image frame according to the result of the determining.

The parameter regarding the characteristics of the inserted image frame may be a parameter regarding at least one selected from the group consisting of a fade-in editing method, a fade-out editing method, a dissolve editing method, and a wipe editing method, which are applied to the current inserted image frame.

The parameter regarding the characteristics of the inserted image frame may be a parameter regarding at least one image effect selected from the group consisting of a filter effect and a color inversion effect, applied to the current inserted image frame.

The determining may include: detecting at least one image frame inserted to edit the image sequence from the image sequence.

According to another aspect of the present invention, there is provided an image decoding method including: determining whether a current image frame is encoded by using a parameter regarding characteristics of an image frame; and restoring the current image frame by selectively using a parameter regarding the characteristics of the image frame according to a result of the determining.

According to an aspect of the present invention, there is provided an image encoding apparatus including: a parameter encoding unit encoding at least one image frame inserted to edit an image sequence by using a parameter regarding characteristics of an image frame and generating a bitstream regarding the at least one image frame; and an image encoding unit performing prediction encoding with respect to other image frames of the image sequence and generating a bitstream of the other image frames; and a multiplexer multiplexing the bitstream of the at least one image frame and the bitstream of the other image frames and generating an image sequence bitstream.

According to an aspect of the present invention, there is provided an image decoding apparatus including: a demultiplexer receiving an image sequence bitstream and demultiplexing a bitstream of the at least one image frame inserted to edit the image sequence and a bitstream of other image frames of the image sequence based on the received bitstream; an inserted image restoring unit restoring the at least one image frame inserted to edit the image sequence by using a parameter regarding characteristics of the image frame; and an image decoding unit performing prediction decoding on the other image frames of the image sequence and restoring the other image frames.

According to an aspect of the present invention, there is provided a computer readable recording medium having recorded thereon a program for executing the image encoding method and image decoding method.

According to an aspect of the present invention, there is an image encoding method including: determining whether a current image frame is an inserted image frame; and encoding the current image frame by selectively using a parameter regarding characteristics of the current image frame according to a result of the determining.

According to an aspect of the present invention, an image encoding apparatus includes: a parameter encoding unit which encodes at least one image frame inserted in an image sequence, by using a parameter regarding characteristics of an image frame and generates a bitstream of the at least one image frame; and an image encoding unit which performs prediction encoding with respect to other image frames of the image sequence and generates a bitstream of the other image frames; and a multiplexer which multiplexes the bitstream of the at least one image frame and the bitstream of the other image frames and generates an image sequence bitstream.

According to an aspect of the present invention, there is an image decoding apparatus including: a demultiplexer which receives an image sequence bitstream and demultiplexes a bitstream of the at least one image frame inserted in the image sequence and a bitstream of other image frames of the image sequence from the received image sequence bitstream; an inserted image restoring unit which restores the at least one image frame inserted in the image sequence by using a parameter regarding characteristics of the image frame; and an image decoding unit which performs prediction decoding on the other image frames of the image sequence and restores the other image frames.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, exemplary embodiments of the present invention will be described more fully with reference to the accompanying drawings, in which exemplary embodiments of the invention are shown.

Figure 1:
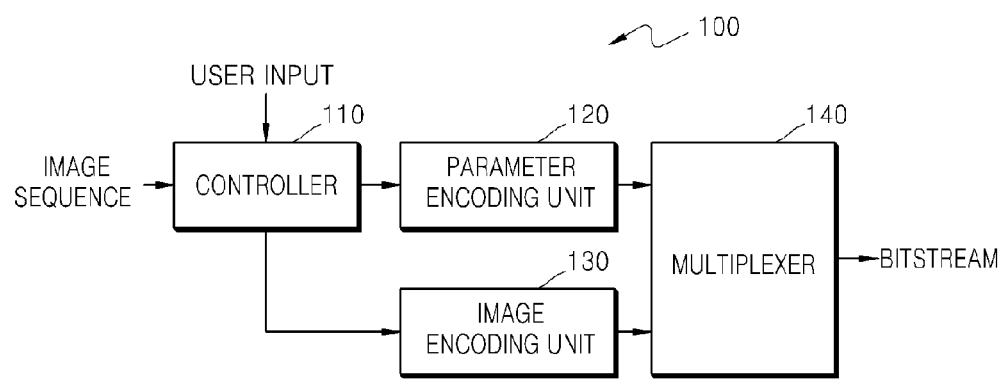
FIG. 1 is a block diagram of an image encoding apparatus according to an exemplary embodiment of the present invention.

FIG. 1 is a block diagram of an image encoding apparatus 100 according to an exemplary embodiment of the present invention. Referring to FIG. 1, the image encoding apparatus 100 includes a controller 110, a parameter encoding unit 120, an image encoding unit 130, and a multiplexer 140.

The controller 110 determines whether an input image sequence includes at least one artificially inserted image frame. A plurality of applications can easily edit an image, which is popularized owing to user created content (UCC). At least one artificially generated image frame is inserted into the image sequence generated by initially photographing or capturing a subject while the image sequence is edited and is encoded at high compressibility by using a method different from a conventional image encoding method, thereby greatly increasing encoding compressibility of the image sequence. This will be described in more detail with reference to FIG. 2.

Figure 2:
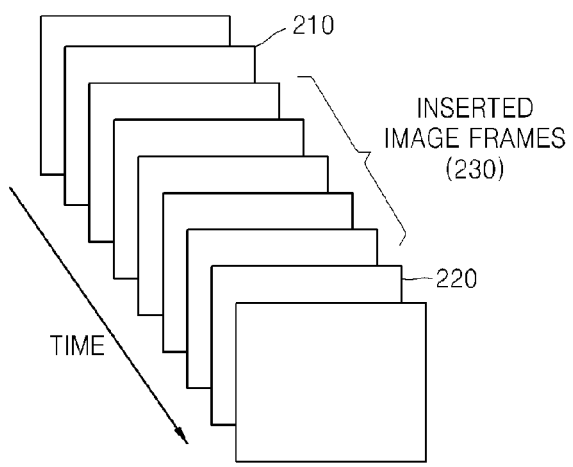
FIG. 2 illustrates an image sequence according to an exemplary embodiment of the present invention.

FIG. 2 illustrates an image sequence according to an exemplary embodiment of the present invention. Referring to FIG. 2, the image sequence includes a plurality of image frames 230 that are artificially inserted between image frames 210 and 220 of an initially generated image sequence. Although the image frames 230 may be artificially inserted between image frames 210 and 220 while the image sequence is edited, the present invention is not limited thereto, and the image frames 230 may be all image frames that are artificially inserted into the initially generated image sequence.

For example, if the image frames 210 and 220, which are previous and subsequent to the image frames 230, respectively, concern different scenes, the image frames 230 may be inserted between scenes so as to change scenes.

The image frames 230 may be inserted between image frames 210 and 220 in order to naturally change scenes by overlapping the image frames 210 and 220 which are previous and subsequent to the image frames 230, respectively, like when a scene dissolves. Also, the image frames 230 may concern a subtitle inserted between scenes in order to indicate a change in scenes.

Referring to FIG. 1, the controller 110 may determine whether each image frame of the image sequence is artificially inserted into the initially generated image sequence according to a user's input. If image frames are inserted into the image sequence in order to edit the image sequence, such a fact may be indicated while an image is being edited. The controller 110 determines that the image frames, which are indicated to be inserted into the image sequence in order to edit the image sequence, are artificially inserted into the image sequence, and determines that the other image frames are not artificially inserted into the image sequence.

The controller 110 may detect the artificially inserted image frames from the image sequence. This will be described in more detail with reference to FIG. 3.

Figure 3:
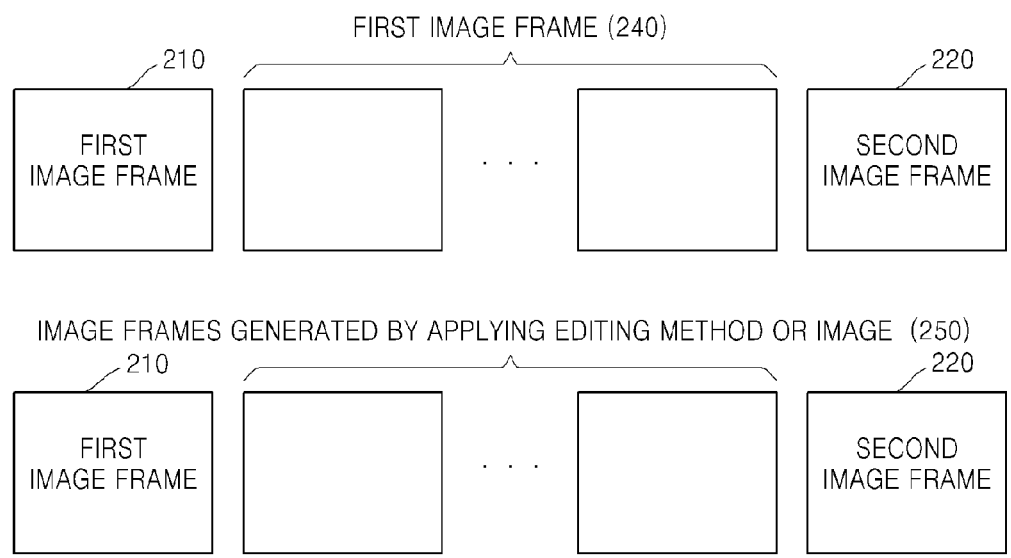
FIG. 3 is a diagram for explaining a method of detecting at least one artificially inserted image frame according to an exemplary embodiment of the present invention.

FIG. 3 is a diagram for explaining a method of detecting at least one artificially inserted image frame according to an exemplary embodiment of the present invention. Referring to FIG. 3, the controller 110 may compare the image frames 240 inserted between the first image frame 210 and the second image frame 220 with other image frames 250 and detect the at least one artificially inserted image frame from the image sequence.

The controller 110 generates a plurality of image frames 250 between the first image frame 210 and the second image frame 220, and compares the image frames 250 with original image frames 240 between the first image frame 210 and the second image frame 220.

In more detail, the controller 110 generates the image frames 250 to which a predetermined editing method or a predetermined image effect is applied between the first image frame 210 and the second image frame 220, and compares the image frames 250 with the original image frames 240.

For example, when a dissolve editing method is used to change scenes between the first image frame 210 and the second image frame 220, the controller 110 generates the image frames 250 by using the dissolve editing method based on the first image frame 210 and the second image frame 220, and compares the image frames 250 with the original image frames 240.

The controller 110 may calculate a means square error (MSE) between the image frames 250 with the original image frames 240, and, if the MSE is 0 or is less than a predetermined threshold value, the controller 110 may detect the original image frames 240 as the artificially inserted image frames 230 by using the dissolve editing method.

The user may use a fade-in editing method, a fade-out editing method, or a wipe editing method other than the dissolve editing method, and may use an image filtering effect, an image color inversion effect, etc. The image filtering effect is used to change a color image into a single color image by using a black and white filter or a sepia filter. Exemplary embodiments of the present invention are not limited to the editing method and the image effect used by the user and the present invention may be applied to other editing methods and image effects.

Referring to FIG. 1, if the controller 110 determines that the image sequence includes the at least one artificially inserted image frame, the parameter encoding unit 120 encodes the at least one artificially inserted image frame by using a parameter regarding characteristics of the at least one artificially inserted image frame.

The parameter encoding unit 120 does not encode a pixel value of the at least image frame by using intra prediction or inter prediction but encodes a parameter regarding the characteristics of the image frame and generates a bitstream regarding the at least one artificially inserted image frame.

The parameter encoding unit 120 encodes a parameter regarding an editing method or a parameter regarding an image effect applied to the at least one artificially inserted image frame. This will be described in more detail with reference to FIGS. 4 and 5.

Figure 4:
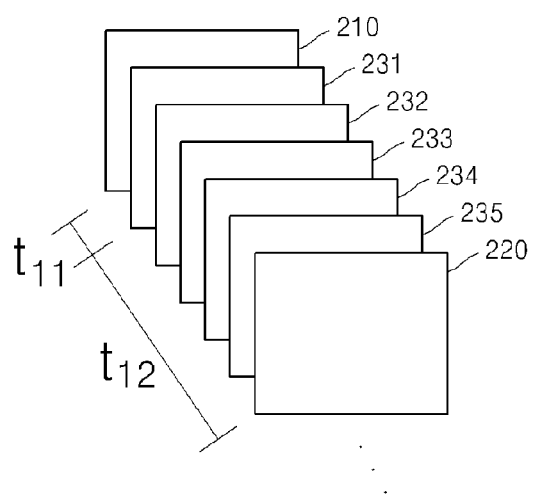
FIG. 4 illustrates two parameters regarding the characteristics of a plurality of image frames according to an exemplary embodiment of the present invention.

FIG. 4 illustrates two parameters $t_{11}$ and $t_{12}$ regarding the characteristics of a plurality of image frames 231 through 235 according to an exemplary embodiment of the present invention. Referring to FIG. 4, the image frame 231 through 235 are inserted between the previous image frame 210 and the subsequent image frame 220 by using the dissolve editing method described with reference to FIG. 2.

According to the dissolve editing method, scenes of the image sequence are changed from a scene of the previous image frame 210 into a scene of the subsequent image frame 220 by the image frame 231, and thus the image frames 231 through 235 may be generated by combining pixel values of the previous image frame 210 and the subsequent image frame 220. Thus, a parameter regarding the dissolve editing method may be used to calculate pixel values of the image frames 231 through 235 from the pixel values of the previous image frame 210 and the subsequent image frame 220.

For example, the pixel values of the image frames 231 through 235 may be calculated by summing weights of the pixel values of the previous image frame 210 and the subsequent image frame 220. The pixel values of the initial image frame 231 may be calculated from $P_{231}=P_{210}*(1/t_{11})+P_{220}(1/t_{12})$ based on a time interval $t_{11}$ between the previous image frame 210 and the initial image frame 231 and a time interval $t_{12}$ between the initial image frame 231 and the subsequent image frame 220. $P_{231}$ denotes the pixel value of the initial image frame 231. $P_{210}$ denotes the pixel value of the previous image frame 210. $P_{220}$ denotes the pixel value of the image frame 220. The pixel values of the image frames 232 through 235 may be calculated by using the same method as described above.

For example, if parameters, for example, $t_{11}$ and $t_{12}$, regarding an editing method are encoded, the initial image frame 231 may be encoded without performing prediction encoding with respect to the pixel value of the initial image frame 231.

Also, the parameters regarding an editing method may have regularity. The image frames 231 through 235 have regularity as a result of comparing the image frames 231 through 235 with the previous image frame 210 and the subsequent image frame 220. For example, time intervals used to calculate pixel values increase or decrease by a predetermined amount. In more detail, time intervals from the previous image frame 210 increase by a predetermined amount closer to the subsequent image frame 220, and time intervals from the subsequent image frame 220 decrease by a predetermined amount.

Therefore, a bitstream of the image frames 231 through 235 may be generated by using the regularity of the parameters regarding the editing method without encoding the parameters $t_{11}$ and $t_{12}$ as described above. For example, the bitstream of the image frames 231 through 235 may be generated by encoding the number (5 in FIG. 4) of the image frames 231 through 235 and parameters indicating that the image frames 231 through 235 are encoded by using the dissolve editing method.

Figure 5:
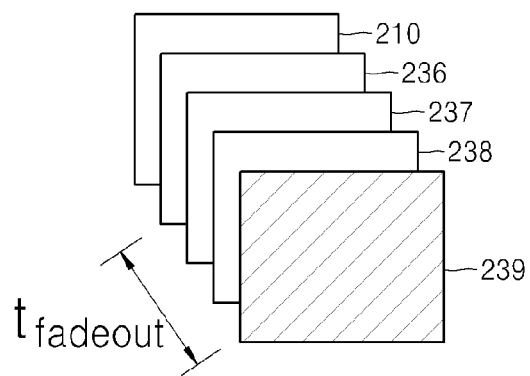
FIG. 5 illustrates a parameter regarding the characteristics of a plurality of image frames according to another exemplary embodiment of the present invention.

FIG. 5 illustrates a parameter $t_{fadeout}$ regarding the characteristics of a plurality of image frames 236 through 239 according to another exemplary embodiment of the present invention. Referring to FIG. 5, the image frames 236 through 239 are inserted between the previous image frame 210 and the subsequent image frame 220 by using a fade-out editing method.

Pixel values of the image frames 236 through 239 that are inserted in order to use the fade-out editing method of fading out an image of the previous image frame 210 may decrease by a predetermined amount. In more detail, a pixel value of the second image frame 237 may be smaller than a pixel value of the first image frame 236 closest to the previous image frame 210, a pixel value of the third image frame 238 may be smaller than a pixel value of the second image frame 237, and the fourth image frame 239 may have the smallest pixel value.

Therefore, a bitstream of the image frames 236 through 239 may be generated by encoding time intervals between the previous image frame 210 and each of the image frames 236 through 239 without encoding the pixel values of the image frames 236 through 239.

Also, the bitstream of the image frames 236 through 239 may be generated by using regularity of the image frames 236 through 239 and the previous image frame 210. That is, a time interval $t_{fadeout}$ taken to fade out the image may be encoded as a parameter regarding the characteristics of the image frames.

If the pixel values of the fourth image frame 239 are 0, the pixel values of each of the image frames 236 through 239 may be calculated by using the time interval $t_{fadeout}$ between the previous image frame 210 and the fourth image frame 239. For example, the pixel value of the first image frame 236 is ¾ of the pixel value of the previous image frame 210, the pixel value of the second image frame 237 is ²⁄₄ of the pixel value of the previous image frame 210, and the pixel value of the third image frame 238 may be ¼ of the pixel value of the previous image frame 210. Therefore, the bitstream of the image frames 236 through 239 may be generated by encoding the parameter of the time interval $t_{fadeout}$ taken to fade out the image.

Although parameters are used to explain the method of editing the image sequence with reference to FIGS. 4 and 5, it would be obvious to one of ordinary skill in the art that the parameter encoding unit 120 may encode various parameters regarding the image effect applied to the artificially inserted image frames as parameters regarding the characteristics of the image frames.

For example, when a black and white filter effect is applied to the image frames, the parameter encoding unit 120 may encode a parameter indicating that a black and white filter is applied and a parameter regarding the degree of filtering.

Referring to FIG. 1, the image encoding unit 130 performs inter or intra prediction encoding with respect to other image frames of the image sequence that are determined to be not artificially inserted into the image sequence as a result of determination of the controller 110. The image encoding unit 130 generates residual values of the other image frames using inter prediction or intra prediction, performs discrete and cosine conversion with respect to the residual values, generates a discrete cosine coefficient, quantizes the discrete cosine coefficient, and performs entropy encoding with respect to the quantized discrete cosine coefficient, thereby generating a bitstream of the other image frames.

The multiplexer 140 multiplexes a bitstream of the at least one image frame generated by the parameter encoding unit 120 and the bitstream of the other image frames, thereby generating an image sequence bitstream.

Figure 6:
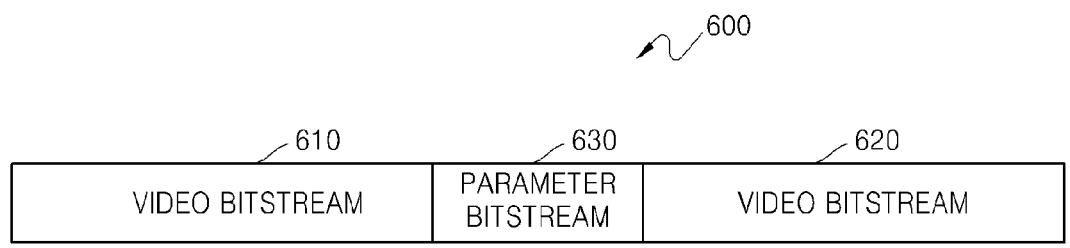
FIG. 6 illustrates an image sequence bitstream including at least one artificially inserted image frame according to an exemplary embodiment of the present invention.

FIG. 6 illustrates an image sequence bitstream including at least one artificially inserted image frame according to an exemplary embodiment of the present invention. Referring to FIG. 6, the image sequence bitstream includes two video bitstreams 610 and 620 regarding a prediction encoded image frame, and a parameter bitstream 630 regarding the at least one artificially inserted image frame generated by encoding a parameter regarding characteristics of an image.

Figure 7:
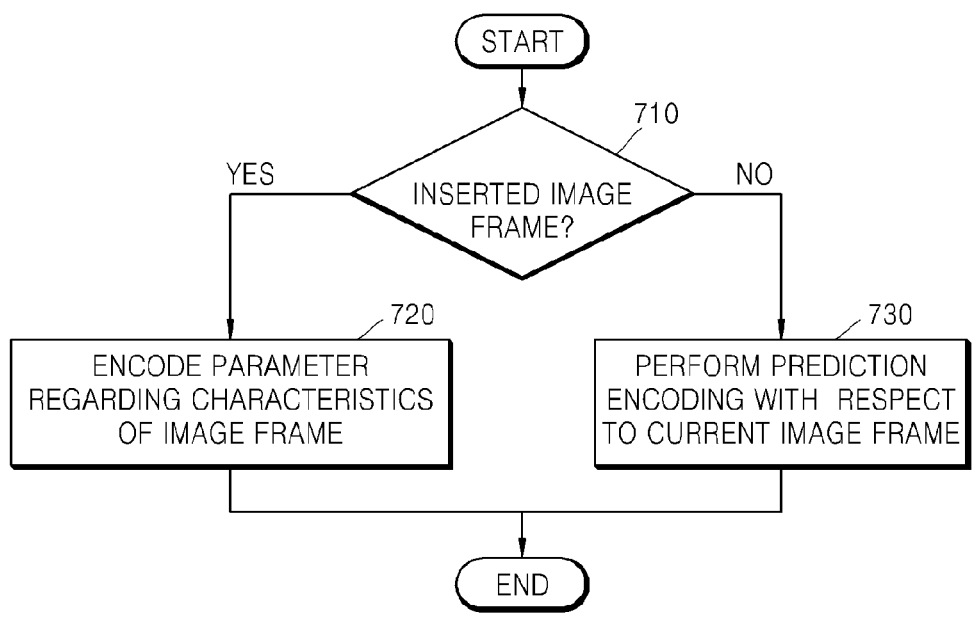
FIG. 7 is a flowchart illustrating an image encoding method according to an exemplary embodiment of the present invention.

FIG. 7 is a flowchart illustrating an image encoding method according to an exemplary embodiment of the present invention. Referring to FIG. 7, in operation 710, the image encoding apparatus 100 of the present invention determines whether a current image frame is an artificially inserted image frame. As described above, since at least one artificially generated image frame may be inserted into the initially generated image sequence by photographing a subject, while the image sequence is being edited, the image encoding apparatus 100 determines whether the current image frame is the artificially inserted image frame that is inserted during the editing of the initially generated image sequence.

The image encoding apparatus 100 determines whether the current image frame indicates an the image frame artificially inserted by a user during image editing, or whether the current image frame is one of at least one artificially inserted image frame detected by using the method described with reference to FIG. 3.

In operation 720, the image encoding apparatus 100 encodes the artificially inserted image frame by using a parameter regarding the characteristics of the image frame. When the image encoding apparatus 100 determines that the current image frame is the artificially inserted image frame, the image encoding apparatus 100 encodes the parameter regarding the characteristics of the image frame without encoding pixel values of the image frame and generates a bitstream of the current image frame. The parameter regarding the characteristics of the image frame may be a parameter regarding an image editing method or a parameter regarding the image effect. This has been described in detail with reference to FIGS. 4 and 5.

In operation 730, the image encoding apparatus 100 performs prediction encoding with respect to the current image frame. When the image encoding apparatus 100 determines that the current image frame is not the artificially inserted image frame, the image encoding apparatus 100 performs prediction encoding with respect to pixel values of the current image frame. The image encoding apparatus 100 performs inter or intra prediction with respect to the pixel values of the current image frame and generates residual values based on a prediction result. The image encoding apparatus 100 performs discrete and cosine conversion, quantization, and entropy encoding with respect to the residual values, and generates a bitstream of the current image frame.

Figure 8:
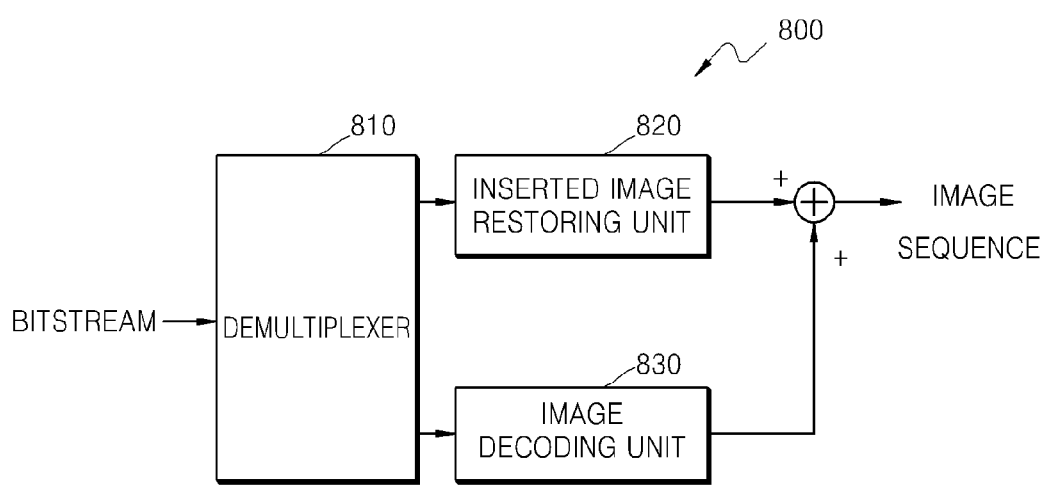
FIG. 8 is a block diagram of an image decoding apparatus according to an exemplary embodiment of the present invention.

FIG. 8 is a block diagram of an image decoding apparatus 800 according to an exemplary embodiment of the present invention. Referring to FIG. 8, the image decoding apparatus 800 includes a demultiplexer 810, an inserted image restoring unit 820, and an image decoding unit 830.

The demultiplexer 810 receives an image sequence bitstream, and demultiplexes a bitstream generated by encoding a parameter of characteristics of an image and a bitstream of a prediction encoded image frame. The bitstream generated by encoding the parameter of the characteristics of the image is a bitstream of at least one image frame that is artificially inserted into the image sequence. The bitstream of the prediction encoded image frame is a bitstream of image frames other than the at least one image frame that is artificially inserted into the image sequence.

The demultiplexer 810 determines whether each of the bitstreams is the bitstream of the at least one image frame that is artificially inserted into the image sequence based on a header of each bitstream, and demultiplexes the bitstreams.

The inserted image restoring unit 820 receives the bitstream of the at least one image frame that is artificially inserted into the image sequence from the demultiplexer 810, decodes the bitstream, and extracts the parameter regarding the characteristics of the image frame.

The inserted image restoring unit 820 restores the at least one image frame that is artificially inserted into the image sequence based on the extracted parameter regarding the characteristics of the image frame. For example, the inserted image restoring unit 820 may restore the at least one selected from the group consisting of image frames 231 through 235 that are artificially inserted so as to dissolve the image sequence based on the parameter relating to the dissolve editing method described with reference to FIG. 2. The inserted image restoring unit 820 may restore the at least one selected from the group consisting of image frames 236 through 239 that are artificially inserted so as to fade out the image sequence based on the parameter relating to the fade-out editing method described with reference to FIG. 5. The inserted image restoring unit 820 may restore the at least one image frame to which a predetermined image effect is applied based on a parameter relating to an image effect.

When the at least one image frame that is artificially inserted into the image sequence is restored based on a previous image frame or a subsequent image frame as shown in FIGS. 4 and 5, the inserted image restoring unit 820 restores the previous image frame or the subsequent image frame by performing prediction decoding with respect to the previous image frame or the subsequent image frame and then restores the at least one image frame that is artificially inserted into the image sequence by using the restored previous image frame or the restored subsequent image frame.

The image decoding unit 830 receives a bitstream of the image frames other than the at least one image frame that is artificially inserted into the image sequence from the demultipelxer 810, performs prediction decoding with respect to the bitstream, and restores the image frames.

The image decoding unit 830 performs entropy decoding and de-quantization with respect to the bitstream, generates a discrete cosine coefficient, performs inverse discrete cosine transform with respect to the discrete cosine coefficient, and generates residual values of the current image frame. The image decoding unit 830 restores the image frames by summing prediction values and the residual values of the current image frame generated by performing inter or intra prediction.

The image sequence is restored by sequentially combining the at least one image frame that is artificially inserted into the image sequence restored by the inserted image restoring unit 820 and the image frames restored by the image decoding unit 830.

Figure 9:
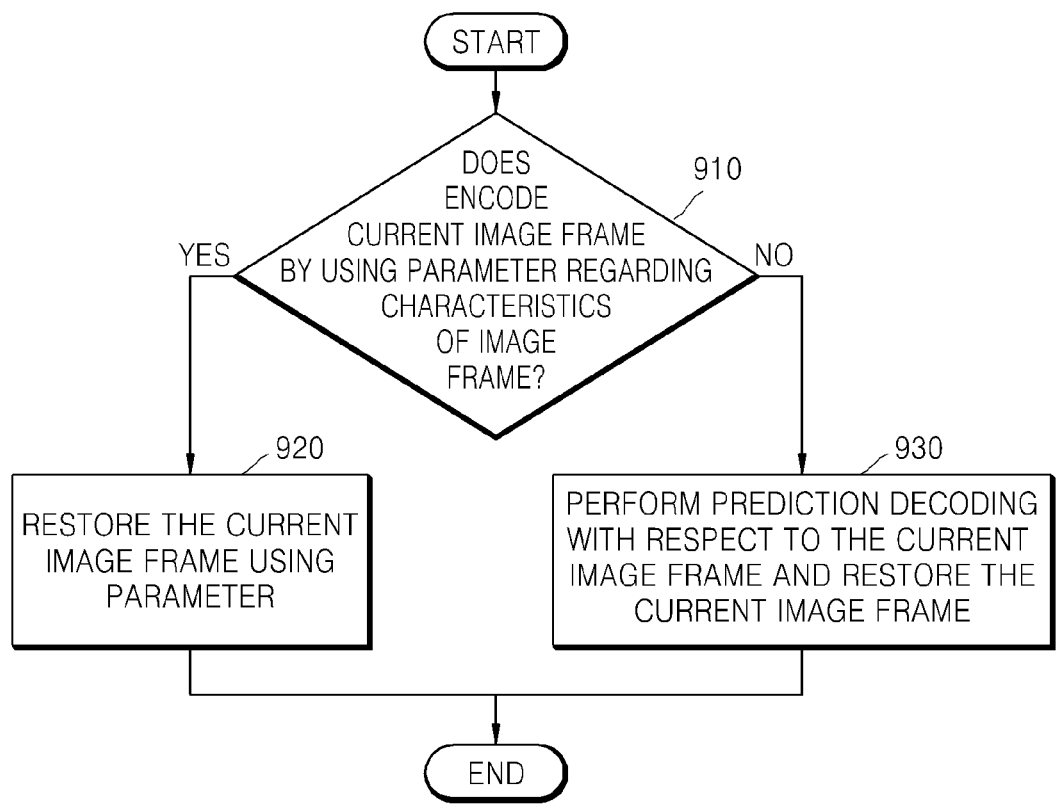
FIG. 9 is a flowchart illustrating an image decoding method according to an exemplary embodiment of the present invention.

FIG. 9 is a flowchart illustrating an image decoding method according to an exemplary embodiment of the present invention. Referring to FIG. 9, in operation 910, the image decoding apparatus 800 determines whether a bitstream of a current image frame is encoded by using a parameter regarding the characteristics of the image frame.

The image decoding apparatus 800 determines whether the current image frame is encoded by using the parameter regarding the characteristics of the image frame, i.e. a parameter regarding an image editing method or a parameter regarding an image effect, based on a header of the bitstream of the current image frame.

In operation 920, if the image decoding apparatus 800 determines that the current image frame is encoded by using the parameter regarding the characteristics of the image frame, the image decoding apparatus 800 decodes the parameter regarding the characteristics of the image frame. The image decoding apparatus 800 restores the current image frame based on the decoded parameter regarding the characteristics of the image frame. The method of restoring at least one image frame that is artificially inserted into the image sequence was described in detail with reference to the inserted image restoring unit 820 of FIG. 8.

In operation 930, if the image decoding apparatus 800 determines that the current image frame is not encoded by using the parameter regarding the characteristics of the image frame, the image decoding apparatus 800 restores the current image frame by performing prediction decoding with respect to the current image frame. The image decoding apparatus 800 performs entropy decoding and de-quantization with respect to the bitstream, generates a discrete cosine coefficient, performs inverse discrete cosine transform with respect to the discrete cosine coefficient, and generates residual values of the current image frame. The image decoding apparatus 800 restores the image frames by summing prediction values and the residual values of the current image frame generated by performing inter or intra prediction.

The invention can also be embodied as computer readable codes on a computer readable recording medium.

For example, the image encoding apparatus and image decoding apparatus of the present exemplary embodiments may include a bus coupled to each unit shown in FIGS. 1 and 8 and at least one processor coupled to the bus. The image encoding apparatus and image decoding apparatus of the present exemplary embodiments may also include a memory coupled to the bus to store an instruction, a received message or a generated message, and the memory may be coupled to the at least one processor to execute the instruction.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image encoding method comprising:
   determining whether a current image frame is an inserted image frame; and
   skipping prediction encoding with respect to the current image frame and encoding the parameter regarding the characteristics of the current image frame to generate a first bit stream, the parameter regarding the characteristics of the current image frame being used for encoding of the current image frame, if the current image frame is the inserted image frame according to the result of the determining, and performing prediction encoding with respect to the current image frame if the current image frame is not the inserted image frame according to the result of the determining.

2. The method of claim 1, wherein the parameter regarding the characteristics of the current image frame that is the inserted image frame, is a parameter regarding at least one of a fade-in editing method, a fade-out editing method, a dissolve editing method, and a wipe editing method, which is applied to the current image frame that is the inserted image frame.

3. The method of claim 1, wherein the parameter regarding the characteristics of the current image frame that is the inserted image frame, is a parameter regarding at least one of a filter effect and a color inversion effect, applied to the current image frame that is the inserted image.

4. The method of claim 1, wherein the determining comprises:
   detecting at least one inserted image frame from an image sequence.

5. The method of claim 4, wherein the detecting of the at least one inserted image frame comprises:
   comparing at least one image frame selected from an image sequence comprising a first image frame and a second image frame, with the at least one inserted image frame generated by using at least one of a fade-in editing method, a fade-out editing method, a dissolve editing method, and a wipe editing method.

6. The method of claim 4, wherein the detecting of the at least one image frame comprises:
   comparing at least one selected from an image sequence comprising a first image frame and a second image frame with the at least one inserted image frame generated by applying at least one of a filter effect and a color inversion effect.

7. An image decoding method comprising:
   determining whether a current image frame is encoded by using a parameter regarding characteristics of an image frame; and
   restoring the current image frame by using the parameter regarding the characteristics of the image frame if the current image frame is an inserted image frame according to the result of the determining, and performing prediction decoding with respect to the current image frame and restoring the current image frame if the current image frame is not an inserted image frame according to the result of the determining.

8. The method of claim 7, wherein the parameter regarding the characteristics of the image frame is a parameter regarding at least one of a fade-in editing method, a fade-out editing method, a dissolve editing method, and a wipe editing method, which is applied to the current image frame that is the inserted image frame.

9. The method of claim 7, wherein the parameter regarding the characteristics of the image frame is a parameter regarding at least one of a filter effect and a color inversion effect, applied to the currently image frame that is the inserted image frame.

10. An image encoding apparatus comprising:
- a controller which determines whether a current image frame is an inserted image frame and controls, if the current image frame is an inserted image frame, the current image frame to be skipped in prediction encoding;
- a parameter encoding unit which encodes parameters regarding characteristics of the current image frame and generates a first bit stream, the parameters regarding characteristics of the current image frame being used for encoding of the current image frame, if the current image frame is an inserted image frame according to the result of the determining of the controller; and
- an image encoding unit which performs prediction encoding with respect to the current image frame and generates a second bit stream if the current image frame is not an inserted image frame according to the result of the determining.

11. The apparatus of claim 10, wherein the parameter regarding the characteristics of the current image frame is a parameter regarding at least one of a fade-in editing method, a fade-out editing method, a dissolve editing method, and a wipe editing method, which is applied to the current image frame.

12. The apparatus of claim 10, wherein the parameter regarding the characteristics of the current image frame is a parameter regarding at least one of a filter effect and a color inversion effect, applied to the current image frame.

13. An image decoding apparatus comprising:
- a demultiplexer which receives an image sequence bit stream and demultiplexes a first bit stream of at least one image frame inserted in the image sequence and a second bit stream of other image frames of the image sequence from the received image sequence bit stream;
- an inserted image restoring unit which restores the at least one image frame inserted in the image sequence by using a parameter regarding characteristics of the at least one image frame; and
- an image decoding unit which performs prediction decoding on the other image frames of the image sequence and restores the other image frames.

14. The apparatus of claim 13, wherein the parameter regarding the characteristics of the image frame is a parameter regarding at least one of a fade-in editing method, a fade-out editing method, a dissolve editing method, and a wipe editing method, which is applied to the at least one inserted image frame.

15. The apparatus of claim 13, wherein the parameter regarding the characteristics of the image frame is a parameter regarding at least one of a filter effect and a color inversion effect, applied to the at least one inserted image frame.

16. A non-transitory computer readable recording medium having recorded thereon a program for executing the method of claim 1.

17. A non-transitory computer readable recording medium having recorded thereon a program for executing the method of claim 7.

18. The apparatus of claim 10, further comprising a multiplexer which multiplexes the first bit stream and the second bit stream and generates an image sequence bit stream image sequence.

* * * * *